United States Patent [19]
Scott

[11] 3,804,595
[45] Apr. 16, 1974

[54] APPARATUS FOR PRODUCING GASEOUS MOISTURE CALIBRATION STANDARDS

[75] Inventor: David J. Scott, Emmaus, Pa.

[73] Assignee: Air Products and Chemicals, Inc., Allentown, Pa.

[22] Filed: Feb. 29, 1972

[21] Appl. No.: 230,429

[52] U.S. Cl............ 23/288 J, 23/254 R, 23/288 F, 252/372, 252/408, 423/239
[51] Int. Cl....... B01j 9/04, C09k 3/00, G01n 33/00
[58] Field of Search.......... 23/288 R, 288 H, 288 J, 23/288 K, 288 M, 288 F, 254 R, 254 E, 232 R; 423/239; 252/372, 408

[56] References Cited
UNITED STATES PATENTS

| | | | |
|---|---|---|---|
| 2,578,193 | 12/1951 | Marshall, Jr. | 23/288 J |
| 3,240,554 | 3/1966 | Angerhofer | 423/219 |
| 3,479,144 | 11/1969 | Brose | 23/288 F |
| 3,653,844 | 4/1972 | Clardy et al. | 23/288 J X |
| 3,630,956 | 12/1971 | Benning et al. | 252/372 |

Primary Examiner—Joseph Scovronek
Attorney, Agent, or Firm—James C. Simmons; Barry Moyerman

[57] ABSTRACT

Moisture calibration standards for analytical instruments are produced by passing a gas containing hydrogen and nitrous oxide through a reactor containing a finely divided silver on alumina catalyst that is heated to a constant temperature wherein the hydrogen and oxygen in the form of nitrous oxide are combined to form water vapor in the gas. The reactor is constructed so that the catalyst is contained in a uniformly heated chamber and will provide stoichiometric combination at varying outlet flow rates. A further feature of the reactor is that it is lightweight, easily portable, and can be readily coupled to instruments, such as a hygrometer or other devices for calibration.

2 Claims, 2 Drawing Figures

APPARATUS FOR PRODUCING GASEOUS MOISTURE CALIBRATION STANDARDS

BACKGROUND OF THE INVENTION

This invention pertains to the field of gaseous calibration standards of known moisture content. Such standards are required for electronic and analytical equipment standardization; e.g., a precisely humidified standard (accuracy to plus or minus five per cent) is required for calibrating a hygrometer.

One method of achieving these standards is shown in U.S. Pat. No. 3,630,956, owned by the assignee of the present invention. The patentee's invention is primarily directed to producing known concentrations of water vapor in high pressure gas cylinders. That this method is good cannot be denied; however, due to the absorption/desorption effects which take place in such containers due to fluctuations in cylinder pressure and temperature, precise calibration standards are difficult to achieve. Cylinders, so produced, have a moisture content that will vary with time; and furthermore, due to the low saturated water capacity of gases stored at 100 to 200 atmospheres, the concentration of moisture in such high pressure gas cylinders is severely limited.

Another method disclosed by patentee involves catalytic conversion of hydrogen and nitrous oxide in the presence of a heated catalyst to form water vapor. This method has been satisfactory except in providing precise moisture calibration standards; the method having been used for filling cylinders which suffer from the inherent problems set out above.

SUMMARY OF THE INVENTION

It has been discovered that the catalytic conversion of hydrogen and nitrous oxide can be carried out stoichiometrically in a lightweight, portable, insulated reactor wherein is disposed a catalyst chamber containing a finely divided silver on alumina catalyst, the chamber being temperature controlled by an internal thermostatically controlled heating element. The reactor can be used with an instrument undergoing calibration to provide continuous precise moisture standards in gases discharged from high pressure cylinders in concentrations of from 5 parts per million to saturation. Such concentrations are stable from full cylinder pressure to almost empty cylinder pressure.

Therefore, it is the primary object of this invention to provide a reactor for precise conversion of hydrogen and oxygen to water vapor in a gas.

It is another object of this invention to provide a precise humidified gaseous calibration standard at the point of use.

It is yet another object of this invention to provide a method and apparatus for precisely humidifying gaseous effluent from a high pressure cylinder over the full range of the cylinder pressure fluctuation during discharge.

It is a further object of this invention to provide a lightweight, inexpensive, readily portable reactor for catalytically converting hydrogen and nitrous oxide in a carrier gas to water vapor stoichiometrically for precise calibration of scientific instruments.

DETAILED DESCRIPTION OF THE PREFERRED EMBODIMENT

Stable moisture contents are produced in a carrier or background gas by catalytic conversion of predetermined quantities of nitrous oxide and hydrogen across a heated catalyst bed only if there is no moisture absorbed in the catalyst bed or in the associated piping. An absorption/desorption process can and usually does take place with prior art schemes resulting in fluctuation of the moisture content of the gas leaving the catalyst bed thereby making such mixtures unsuitable for use as calibration standards.

Figure 1:
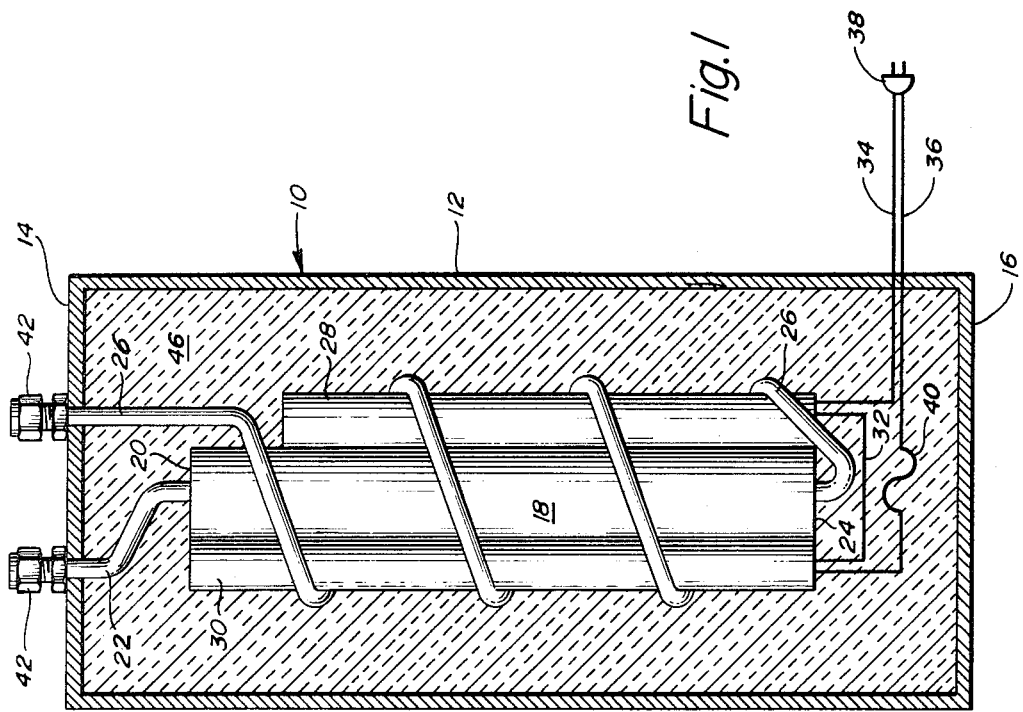
FIG. 1 is a cross-sectional view of a reactor according to the present invention.

As a first step in satisfying the requirement for development of a method and apparatus for producing precise moisture calibration standards, it was necessary to devise a reactor. Shown in FIG. 1 is a reactor 10 that is generally cylindrical in shape having shell or housing 12 with removable top and bottom caps 14, 16 respectively. The housing 12 and caps 14, 16 can be fabricated from most readily available structural materials, a molded fiberglass such as glass cloth phenolic tubing and sheet sold by Commercial Plastic Company of Philadelphia, Pa., being preferred for insulating as well as fabrication properties. The tubing has a ¼ inch wall, 3 inch inside diameter and is 8¾ inches in length and the sheet nominally ⅛ inch thick. Disposed within the housing 12 is a catalyst chamber 18 of generally cylindrical shape fabricated from a stainless steel tube. On the upper end of the catalyst chamber 18 there is provided an end closure 20 having a conduit 22 therethrough for fluid communication with the interior of the catalyst chamber 18. On the lower end the catalyst chamber 18 is an end closure 24 having a conduit 26 therethrough for fluid communication with the interior of the catalyst chamber 18. On one side of catalyst chamber 18 is an electrical heating element 28 having a capacity of about 200 watts under a standard 115 volt a.c. potential. On the other side of catalyst chamber 18 is a thermostat 30 electrically connected to heater 28 by conduit 32 for controlling the heater so that the catalyst chamber is maintained at between 120° and 180°C. Electrical conduits 34, 36 are connected to a standard plug 38 and the heater 28 and thermostat 30, respectively. In conduit 36 is a thermal fuse 40 for preventing overheating of the reactor 10. A heater 28 such as Electric Cartridge Heater P/N-TB3817 (120 volts) and a thermostat such as Model P/N-1A1B2 set at 130°C, both obtained from ITT Vulcan Electric of Kezar Falls, Maine, have been found to work satisfactorily in a reactor constructed as shown.

The heater 28 and thermostat 30 are held in contact with the catalyst chamber by wrapping conduit 26 around the bundle or assembly as shown.

Conduits 22, 26 are passed through the cover 14 and provided with compression fittings 42 for connection to standard gas piping. The space between the catalyst chamber heater assembly 18, 28, 30 and the housing 12 is filled with a thermal insulating material 46 such as a siliceous volcanic rock containing 70 to 80 percent silica and commonly called perlite.

Catalyst chamber 18 is filled with a finely divided 67 percent silver on alumina catalyst designated as No. 733X1-1 obtained from the Houdry Process Company. As mentioned above, one of the problems inherent in prior art schemes was the fact that the catalyst itself tended to absorb water. While this is not troublesome in humidifying gases for synthetic breathing atmospheres and the like, it is a problem in achieving a precisely humidified gas to be used as a calibration standard. Catalysts such as palladium and rhodium, supported on kaolin, were found to absorb moisture even at high operating temperatures. An unsupported palladium catalyst was also found to suffer the same defect. It was discovered that the 67 percent silver on alumina catalyst, having a particle size distribution of −28/+65 according to a standard Tyler Sieve analysis, operating at a temperature of between 120° and 180 °C not only resisted absorbing moisture but caused 100 per cent stoichiometric conversion of the hydrogen nitrous oxide in the carrier gas.

A reactor such as 10, when assembled, will be approximately 9 inches high, 3 and ½ inches in diameter, and weigh about 1 pound.

Figure 2:
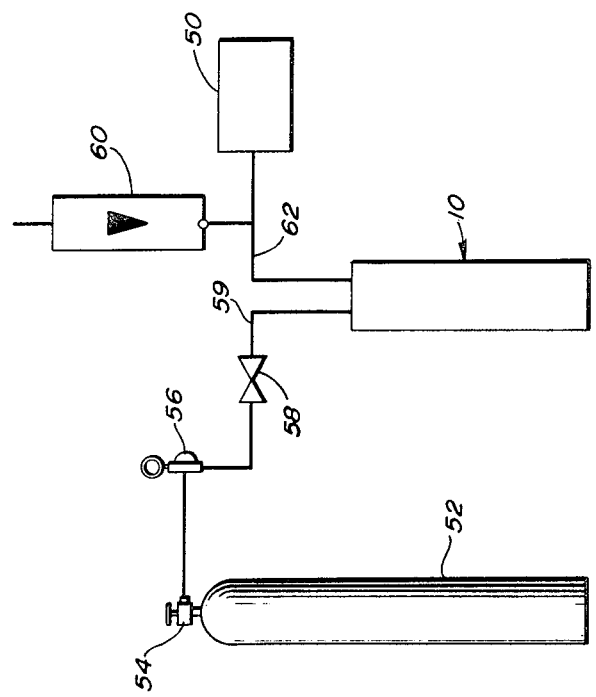
FIG. 2 is a schematic diagram of the reactor of FIG. 1 in use.

There is shown in FIG. 2 a typical setup for providing a humidified gas to an instrument 50 such as a hygrometer. In the setup shown, a gas cylinder 52 is connected at the discharge valve 54 to a high pressure regulator 56 for regulating the gas withdrawal from cylinder 52. On the outlet side of regulator 56 in the conduit 59 between regulator 56 and reactor 10 is a fine metering valve for adjusting the flow to the reactor 10. In conduit 62 between the reactor 10 and instrument 50 is a bypass flowmeter 60 to monitor the flow of gas to the instrument being calibrated. It is preferred that conduit 62 between the reactor 10 and instrument 50 be of stainless steel. The cylinder 10 is charged with a background or carrier gas that has been provided with hydrogen and nitrous oxide in amounts necessary to stoichiometrically combine the hydrogen and oxygen to form water vapor in the background gas. The background gas can be any inert gas such as argon, neon, helium, nitrogen, and mixtures thereof.

In the setup of FIG. 2, it is preferable that regulator 56 be of the high purity metal diaphragm type and that all conduits 59, 62 be of stainless steel and that the length of conduit 62 be at a minimum. If desired, the system can be dried out with extra dry nitrogen or by inserting a drying chamber containing $P_2O_5$ between valve 58 and a reactor 10 to eliminate moisture present as the result of using a standard regulator or non-stainless steel conduit.

Using a setup as shown in FIG. 2, it has been possible to produce gases with from 5 molar ppm $H_2O$ to 6,000 molar ppm $H_2O$ and to deliver mixtures in this range from full cylinder pressure of 2,000 psig down to 50 psig (essentially empty). When operating, it is preferred to keep the reactor inlet pressure at 50 psig maximum by means of regulator 56. The mixture accuracy has been shown to ±5 percent molar ppm of the component value (e.g., nitrous oxide) except where the component value is less than 20 molar ppm in which case accuracy is ±1 molar ppm. These conditions have been observed with outlet flow rates, measured at 60 of FIG. 2, of between 100 cubic centimeters per minute and 5 standard cubic feet per minute.

A reactor according to FIG. 1, charged with 4 grams of 67 percent silver on alumina catalyst, was set up in a test system according to FIG. 2 and the data in Table I below taken from this setup. For each test the background or carrier gas was nitrogen to which was added nitrous oxide and hydrogen as shown:

TABLE I

| Flow cc/min.(1) | $N_2O$ (PPM)(2) | $H_2$ (PPM) | $H_2O$ (PPM) | Temperature of Catalyst Bed (°C) | Time to Reach Equilibrium (Hours) |
|---|---|---|---|---|---|
| 235 | 9.5 | 500 | 9.5 | 150 | 5 |
| 100 | 500 | 5,000 | 500 | 150 | 2.5 |
| 457 | 500 | 5,000 | 500 | 150 | <0.017 |
| 940 | 500 | 5,000 | 500 | 150 | do |
| 1410 | 500 | 5,000 | 500 | 150 | do |
| 100 | 6,000 | 10,000 | 6,000 | 150 | 0.25 |
| 470 | 6,000 | 10,000 | 6,000 | 150 | <0.017 |
| 750 | 6,000 | 10,000 | 6,000 | 150 | do |
| 1410 | 6,000 | 10,000 | 6,000 | 150 | do |
| 2350 | 6,000 | 10,000 | 6,000 | 150 | do |
| 230 | 500 | 7 | 7 | 150 | 4.0 |
| 470 | 700 | 545 | 545 | 150 | 2.0 |
| 470 | 5,000 | 506 | 506 | 150 | 1.0 |

(1) cc/min - cubic centimeters per minute
(2) PPM - parts per million

The data above show that complete conversion was achieved in all of the examples wherein either nitrous oxide ($N_2O$) or hydrogen ($H_2$) was used as the limiting constituent of the mixture in the cylinder. It is also apparent from Table I that complete conversion was accomplished at flows up to 2,350 cubic centimeters per minute.

Having thus described my invention, what I desire to be secured by Letters Patent is set forth in the following claims.

1. A reactor wherein a carrier gas of fixed moisture content is produced by catalytic combination of hydrogen and oxygen comprising in combination:

a generally cylindrical housing having a top and bottom closure;

a catalyst receiving chamber charged with a catalyst consisting of 67 percent silver supported on alumina having a particle size of less than 28 mesh but greater than 65 mesh disposed within and spaced apart from said housing;

heating means fixed to and coextensive with said catalyst chamber for heating said catalyst chamber to a temperature between 100° and 180°C;

thermostat and fuse means connected to said heating means to maintain said heating means within the temperature range of 100° and 180°C and to prevent overheating of said catalyst chamber;

an inlet conduit extending from outside said housing and wound around said catalyst chamber and heating means to a first end of said catalyst chamber; and an outlet conduit extending from a second end of said catalyst chamber outwardly of said housing, whereby said inlet conduit, said catalyst chamber and said outlet conduit define a continuous flow path.

2. An apparatus according to claim 1 wherein insulation is disposed within said housing to support and separate said catalyst chamber and heating means from said housing.

* * * * *